United States Patent [19]
Konuma et al.

[11] Patent Number: 5,475,517
[45] Date of Patent: Dec. 12, 1995

[54] FERROELECTRIC LIQUID CRYSTAL DEVICE WITH ANGLES BETWEEN SMECTIC LAYERS AND THE DIRECTION NORMAL TO THE SUBSTRATES ARE 5-15 DEGREES

[75] Inventors: Toshimitsu Konuma; Takeshi Nishi; Akira Sugawara; Yoshimasa Matsushima, all of Kanagawa; Hitoshi Kondo, Tokyo; Toshimitsu Hagiwara, Kanagawa, all of Japan

[73] Assignee: Semiconductor Energy Laboratory Co., Ltd., Kanagawa, Japan

[21] Appl. No.: 173,484

[22] Filed: Dec. 27, 1993

Related U.S. Application Data

[63] Continuation of Ser. No. 873,128, Apr. 24, 1992, abandoned.

[30] Foreign Application Priority Data

Apr. 27, 1991 [JP] Japan .................................. 3-125025

[51] Int. Cl.⁶ .............................. G02F 1/1337; G02F 1/13
[52] U.S. Cl. .............................. 359/78; 359/75; 359/100
[58] Field of Search .................................. 359/75, 78, 100

[56] References Cited

U.S. PATENT DOCUMENTS

| | | | |
|---|---|---|---|
| 4,813,771 | 3/1989 | Handschy et al. | 359/76 |
| 4,932,758 | 6/1990 | Hanyu et al. | 359/100 |
| 4,986,638 | 1/1991 | Yamazaki et al. | 359/78 |
| 5,005,953 | 4/1991 | Kawagishi | 359/100 |
| 5,046,822 | 9/1991 | Matsuda et al. | 359/78 |
| 5,046,831 | 9/1991 | Yamazaki et al. | 359/100 |
| 5,082,352 | 1/1992 | Kawagishi et al. | 359/78 |
| 5,109,294 | 4/1992 | Hanyu et al. | 359/78 |
| 5,151,804 | 9/1992 | Verhulst et al. | 359/76 |
| 5,151,808 | 9/1992 | Yamazaki et al. | 359/100 |
| 5,164,852 | 11/1992 | Konuma | 359/100 |

*Primary Examiner*—Anita Pellman Gross
*Attorney, Agent, or Firm*—Sixbey, Friedman, Leedom & Ferguson

[57] ABSTRACT

A ferroelectric liquid crystal device is described. The device comprises a pair of substrates, an electrode arrangement formed on the inside surface of the substrates, an orientation control surface provided on the inside surface of one of said substrates, and a blended ferroelectric liquid crystal disposed between the substrates. By suitably preparing the liquid crystal, multi-micro-domains are formed in the liquid crystal. By virtue of the multi-micro-domains, the contrast ratio and the response speed are significantly improved.

16 Claims, 13 Drawing Sheets

FERROELECTRIC LIQUID CRYSTAL DEVICE WITH ANGLES BETWEEN SMECTIC LAYERS AND THE DIRECTION NORMAL TO THE SUBSTRATES ARE 5-15 DEGREES

This application is a continuation of Ser. No. 07/873,128, filed Apr. 24, 1992, now abandoned.

BACKGROUND OF THE INVENTION

1. Field of the Invention

The present invention relates in general to an electro-optical device such as a ferroelectric liquid crystal device. More particularly, it relates to such a ferroelectric liquid crystal device improved with respect to driving characteristics.

2. Description of the Prior Art

As conventional liquid crystal displays, displays utilizing twisted nematic liquid crystal materials are well known in the field. The displays of this type often exhibit cross-talk between adjacent pixels when driven in matrix configuration having a large number of pixels, so that the available pixel number is substantially limited.

Displays of the active matrix type provided with thin film transistors for driving respective pixels are also known. Fabrication of the displays of this type, however, may present difficulties owing to low yield of transistors formed on the substrate particularly when the size of the substrate is increased. The need for relatively large equipment investment also make it difficult to proceed with this type.

A new type display device utilizing ferroelectric, chiral smectic C liquid crystal has been suggested by N. A. Clark et al, in U.S. Pat. No. 4,367,924. In this device, the smectic liquid crystal material is layered, and the layers 12 are aligned perpendicular to opposed surfaces 11 and 11' of the cell as shown in FIG. 1. The liquid crystal molecules lie flat on the surfaces and are restricted at the surface to only two positions (i.e. first and second states (I) and (II) in which the liquid crystal molecules are inclined at $\theta$ and $-\theta$ from the layer normal) out of the cone of possible orientations that the chiral smectic state allows as illustrated in FIG. 9. The surfaces of the cell have to be closely spaced so that the bulk of the sample follows the molecular orientation at the surface, thereby creating the two surface stabilized states. The influence of the surfaces also helps to suppress the helix of the chiral smectic material so that the two states are not disrupted. The dipole moment of spontaneous polarization, points normal to the surfaces, up in the first state and down in the second state for example. Hence, the device can be switched between the two states with a pulsed electric field applied via an electrode on the surface. The influence of the closely spaced surfaces causes the switched state to latch so that the state is maintained after the pulse is over, indicating memory characteristics.

In such a ferroelectric liquid crystal device, it is required to accomplish uniform driving performance throughout the entirety of the device, so that efforts have been made to obtain a liquid crystal layer having a uniform liquid crystal orientation with no defects throughout the entire device, i.e. a mono-domain of the liquid crystal.

The mono-domain, however, cannot be formed due to defects in the ferroelectric liquid crystal caused by small flaws occurring in an orientation film, stepwise unevenness of the electrodes for driving the liquid crystal, spacers provided for maintaining the appropriate gap between the substrates or other causes. An approach to form the mono-domain is to let crystals grow in one direction by virtue of a gradient of temperature. This approach can not be applied for the case of large devices in industrial production, but only for the cases of small devices of about several square centimeters.

Even if a mono-domain can be formed, the layered structure of the liquid crystal often incurs zig-zag defects because the ferroelectric liquid crystal is inherently not aligned in parallel to the substrate to form alignment thereof inclined at a certain angle, so that bending or displacement is caused. For this reason, displaying and driving characteristics become non-uniform.

BRIEF SUMMARY OF THE INVENTION

It is therefore an object of the present invention to provide a ferroelectric liquid crystal device capable of displaying high contrast images uniformly appearing throughout the device.

It is another object of the present invention to propose a new molecular structure of liquid crystal materials suitable for application in displays.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, a ferroelectric liquid crystal device comprises a pair of substrates, an electrode arrangement formed on the inside surface of the substrates, an orientation control surface provided on the inside surface of at least one of said substrates, and a blended ferroelectric liquid crystal disposed between the substrates. By suitably preparing the liquid crystal, multi-micro-domains are formed in the liquid crystal. By virtue of the multi-micro-domains, the contrast ratio and the response speed are significantly improved.

Liquid crystals can have multi-domains in a smectic phase where batonnets are grown in a variety of directions at random. The term "batonnets" refers to regions made of a smectic phase liquid crystal in an isotropic phase liquid crystal, which can be observed when the liquid crystal changes its phase from isotropic to smectic A phase. Multi-micro-domains, introduced by the present invention, are different from such conventional multi-domains. In the multi-micro-domains, respective domains have crystalline axes approximately directed in a common direction. Each domain appears as a fine structure of a short dimension of several micrometers to several tens of micrometers in the layer direction and a long dimension extending for 5–500 times the short dimension in the layer normal.

The inventors have obtained through many efforts such a new structure which can be formed when particular substances are included in the liquid crystal materials. With the new structure comprising the multi-micro-domains, excellent switching contrast was observed.

Next, the ferroelectric liquid crystal material in accordance with the present invention will be explained. The liquid crystal material comprises an optically active first liquid crystal represented by the following formula (I) at 2–30 mol %, an achiral base second liquid crystal represented by the following formula (II) at 55–80 mol % and a third liquid crystal represented by the following formula (III) at 2–15 mol %.

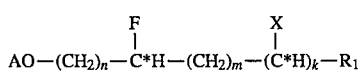  (I)

In the above formula (I), "A" stands for

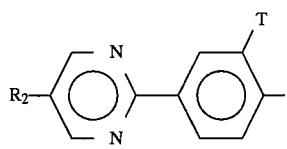

or

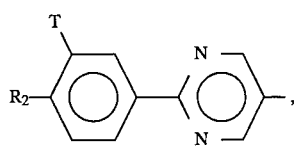

wherein $R_1$ is a straight chain alkyl group comprising 2–8 carbon atoms; $R_2$ is a straight chain alkyl group comprising 8–12 carbon atoms; T is a hydrogen atom or a fluorine atom; X is a fluorine atom or a methyl group; n=1 or 2; m=0–3; k=0–1; and C* is an asymmetric carbon atom.

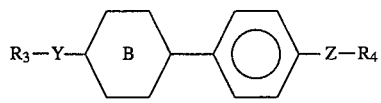  (II)

In the above formula (II),

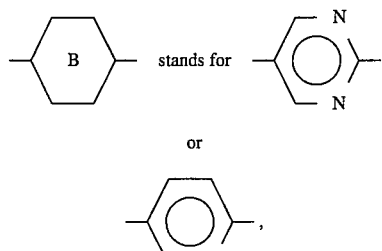

wherein $R_3$ and $R_4$ are straight chain or branched chain alkyl groups comprising 6–14 carbon atoms; Y and Z are a single bond or a —O— respectively.

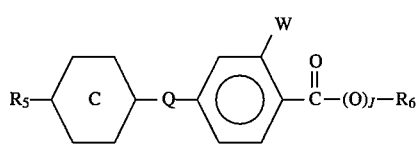  (III)

In the above formula (III),

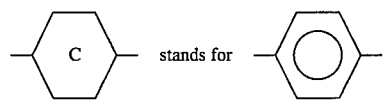

or

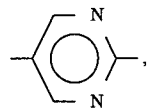, wherein $R_5$ is a straight chain alkyl or alkoxyl group comprising 6–14 carbon atoms; $R_6$ is a straight chain or branched chain alkyl group comprising 6–14 carbon atoms; Q is a single bond or —COO—; W is a hydrogen atom or a fluorine atom; J=0 or 1.

The alkyl group of $R_6$ may comprise an asymmetric carbon atom therein.

By disposing such a liquid crystal material in the device as illustrated in FIG. 3 and described below in detail, multi-micro-domains were observed by a microscope as shown in FIG. 4(A) and FIG. 11(a). FIG. 4(B) and FIG. 11(b) are sketches of the photographs of FIG. 4(A) and FIG. 11(a), respectively. The longest dimension of one domain was several micrometers to several hundreds of micrometers. The ratio of the longest dimension to the shortest dimension of the domain was about 5 to 500. Misalignment occurring in the liquid crystal material can be absorbed by boundaries 9 among the domains 8 so that defects like zigzag defects are unlikely. When driving signals are inputted to the device, high contrast images can be displayed throughout the entire device.

The present inventors analyzed the smectic layer structure of the ferroelectric liquid crystal composition inside the liquid crystal electro-optical device using X-ray diffraction (XRD), and found that the aforementioned problems can be overcome by a liquid crystal electro-optical device having such layer structure that the smectic phase layer direction thereof make an angle of from 5 to 15 degrees with respect to the substrate normal, and that the normal of said smectic phase layers is deviated and distributed at angles of ±25° or more with respect to the orientation control direction of the surface. The smectic phase layers consisting of the liquid crystal described above also exhibit a deviation of their angles with respect to the substrate normal so that the layers incline at an angle of 5 degrees to 15 degrees, with a distribution of the angles being 4 degrees or more. The liquid crystal orientation as observed in such a state within the liquid crystal electro-optical device is, then, not a monodomain having been proposed as ideal by Clark et al., but a "multi-microdomain" in which minute domains are present.

In general, the smectic phase which exhibits a ferroelectric characteristic has a layer structure commonly having bends therein. It has been further made clear through various studies that the zigzag defects referred to hereinbefore occur at such inflection points. Such a layer structure can be analyzed on a liquid crystal cell comprising X-ray transmissible thin glass substrates about 0.1 mm in thickness, using an X-ray diffractometer.

The XRD measurement can be effected by irradiating an X-ray beam onto a cell 12 of a liquid crystal electro-optical device, as shown in FIG. 12. The measurement consists of a theta (θ)-scanning process which comprises obtaining an X-ray diffractogram on a cell rotated around an axis parallel to the cell substrate, and a beta (β)-scanning process which comprises effecting XRD on a cell rotated around an axis normal to the substrate. Thus, the bend structure can be observed by the θ-scanning, whereas the maximum distribution of the smectic layer normal with respect to the orientation control direction (the direction of the uniaxial orientation treatment) can be found by the β-scanning.

To carry out the measurement above, the Bragg angle is determined on a cell for a liquid crystal electro-optical device, which comprises two substrates having incorporated therebetween the same ferroelectric liquid crystal composition oriented perpendicular to the two substrates. The detector is then set so that it makes the same Bragg angle with respect to the incident X-ray beam, so that the substrate (cell) may be rotated around the θ-axis to carry out the θ-scanning (sometimes referred to as θ-2θ scanning). The β-scanning is then performed by fixing the angle of the substrate with respect to the θ-direction at the peak angle obtained in the θ-scanning, while, as was the case in θ-scanning, setting the detector with respect to the incident X-ray at the Bragg angle and irradiating X-ray to the substrate being rotated around the axis of the substrate normal.

A θ-scan X-ray diffractogram for a conventionally known liquid crystal cell having a distinct and typical zigzag defect in the structure as shown in the optical micrograph of FIG. 5 yields a diffraction peak at a diffraction angle of 20 degrees or higher as shown in FIG. 13. The presence of two peaks in the X-ray diffraction pattern is ascribed to the bend in the smectic phase layer, because the X-ray diffraction occurs on both sides of the bend in the layer. Because the Bragg angle of the layer is from 2 to 3 degrees, the absolute value of the angle obtained by subtracting a right angle from the diffraction angle corresponds to the angle of inclination of the smectic phase layer with respect to the substrate normal.

In a typical XRD pattern for the liquid crystal cell according to the present invention, diffraction peaks can be observed at an angle of 81 and 100 degrees as in FIG. 14. By comparing the angle of the diffraction peaks obtained for the cell above with that obtained by θ-scanning a liquid crystal cell having a typical zigzag defect, it can be seen that the layer of the cell of the present invention is inclined at a smaller angle with respect to the substrate normal than the cell having the zigzag defects. The layer structure of the liquid crystal electro-optical device according to the present invention is inclined at an angle of from 5 to 15 degrees with respect to the substrate normal. Furthermore, it can be seen that the diffraction peak for the liquid crystal electro-optical device according to the present invention is broader as compared with the peak for a liquid crystal cell having a typical zigzag defect, amounting to a peak width of 4 degrees or more.

Then, the cell was rotated 380 degrees around the β-axis, i.e., the substrate normal, at the position at which the peak shown in the XRD pattern on FIG. 14 was obtained. The result is shown in FIG. 15. The peak broadening as observed by β-scanning provides clear evidence that the liquid crystal electro-optical device according to the present invention comprises a multi-microdomain orientation in the liquid crystal composition thereof. That is, the peak broadening is a consequence of the layer normal directions being distributed over a wide range; the layer normal directions are not uniform along the orientation control direction (the direction of the uniaxial orientation treatment applied to the substrate).

The multi-microdomain structure as observed under an optical microscope exhibits aggregates of fine domains. In other words, the layer direction in each of the domains are not uniform. The distribution of the non-uniform layer structure can be obtained by β-scanning using an X-ray diffractometer.

It has been found from the data collected in the experiments above that the most deviated direction of the layer normal in each of the domains is distributed at an angle of ±25 degrees or higher with respect to the orientation control direction (the direction of the uniaxial orientation treatment having been applied to the substrate).

The present inventors have conducted extensive studies based on this novel concept and achieved a liquid crystal electro-optical device having a favorable switching contrast by using a ferroelectric liquid crystal composition having a smectic phase oriented under a specified condition.

BRIEF DESCRIPTION OF THE DRAWINGS

The accompanying drawings, which are incorporated in and form a part of the invention, together with the description, serve to explain the principles of the invention.

DETAILED DESCRIPTION OF THE PREFERRED EMBODIMENTS

Figure 1:
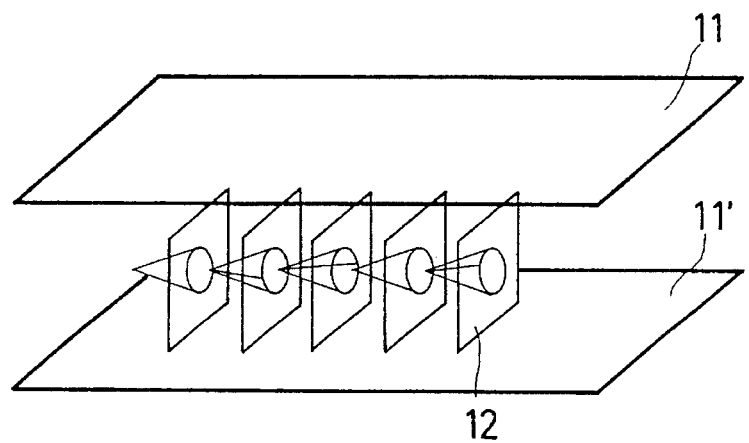
FIG. 1 is a schematic diagram showing a prior art liquid crystal device.
Figure 2:
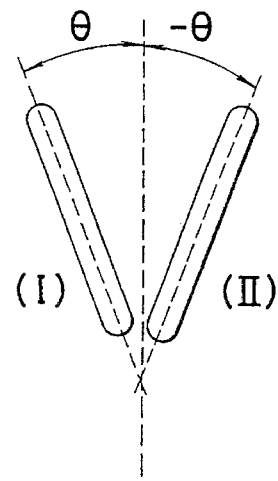
FIG. 2 is an explanatory diagram showing two stable states in a ferroelectric liquid crystal device.
Figure 3:
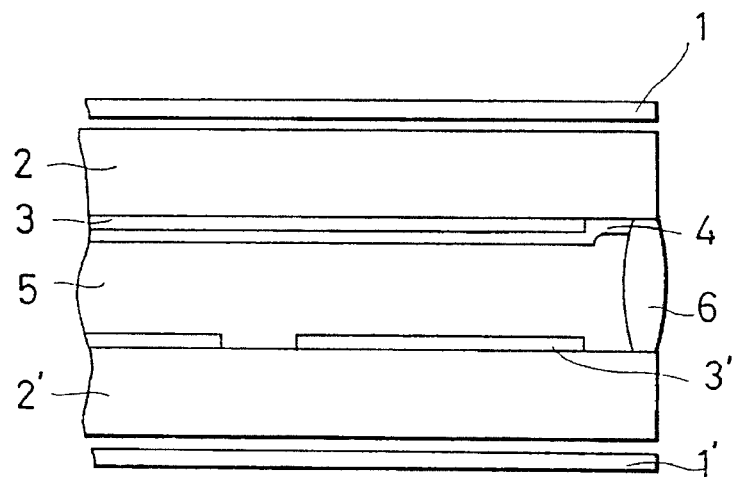
FIG. 3 is a schematic diagram showing a ferroelectric liquid crystal device in accordance with the present invention.

Referring to FIG. 3, a ferroelectric liquid crystal display in accordance with a preferred embodiment of the present invention will be explained.

The liquid crystal display comprises a pair of sodalime glass substrates 2 and 2'. The inside surfaces of the substrates 2 and 2' are formed with an electrode arrangement comprising a first set 3 of parallel conductive strips and a second set 3' of parallel conductive strips in an orthogonal relationship in order to form pixels arranged in a matrix. The electrode arrangement is formed by depositing an ITO film of 800 to 1200 Å thickness by reactive sputtering and etching it with a photoresist mask by the use of an acid etchant including ferric oxide (FeO) in the form of parallel strips. The sheet resistance of the electrodes is 15–25 Ω/cm². One of the substrates 2 is coated with an orientation control film 4 covering the electrode set 3.

The orientation control film 4 is made of an organic resin, e.g. a polyimide (LQ5200 manufactured by Hitachi Chemical Co., Ltd., LP-64 manufactured by Toray Industries, Inc., or JIB manufactured by Japan Synthetic Rubber Ltd.), a nylon such as 6-nylon or 6-6-nylon, or a Langmuir-Blodgett film prepared from a precursor of a polyimide or a polyamide. The control film 4 is coated on the substrate 2 over the electrode set 3 by spin coating, offset press printing or any other suitable method depending upon the material, followed by thermal annealing. The temperature of the annealing is 100°–130° C. in the case of nylons, 250°–300° C., preferably 280°–300° C. in the case of polyimides. The thickness of the film 4 is 100–500 Å. Rubbing treatment is given thereto in one direction as a one-axis orientation treatment by the use of a cotton velvet having piles of 2.5 to 3 mm height and turning at 1000 to 1500 rpm with respect to the substrate moving at 100 to 400 cm/min.

After dusting spacers of 2.5 μm silicon oxide particles on the orientation control film 4, the substrate 2 is joined with the other substrate 2' given no orientation treatment followed by injection therebetween of a ferroelectric liquid crystal 5 which is heated in advance to be an isotropic liquid crystal by utilizing the differential pressure between the external space and the inside of the device (vacuum method). A sealing 6 is provided to avoid loss of the liquid crystal. The spacing between the substrates 2 and 2' is about 2.5 μm. Numerals 1 and 1' designate a pair of polarizing plates.

The liquid crystal 5 is prepared by mixing materials as follow:

| Chemical Formula | Mol % |
|---|---|
| $C_{12}H_{25}$—pyrimidine—phenyl—$OC_{10}H_{21}$ | 1.81 |
| $C_{12}H_{25}$—pyrimidine—phenyl—$OC_8H_{17}$ | 10.77 |
| $C_{10}H_{21}$—pyrimidine—phenyl—$OC_{12}H_{25}$ | 1.78 |
| $C_{10}H_{21}$—pyrimidine—phenyl—$OC_{11}H_{23}$ | 1.71 |
| $C_{10}H_{21}$—pyrimidine—phenyl—$OC_8H_{17}$ | 10.86 |
| $C_9H_{19}$—pyrimidine—phenyl—$OC_{10}H_{21}$ | 7.46 |
| $C_9H_{19}$—pyrimidine—phenyl—$OC_8H_{17}$ | 15.43 |
| $C_8H_{17}$—pyrimidine—phenyl—$OC_{10}H_{21}$ | 14.38 |
| $C_8H_{17}$—pyrimidine—phenyl—$OC_{11}H_{23}$ | 4.59 |
| $C_{12}H_{25}$—pyrimidine—(F)phenyl—O—CH₂CH₂—*CHF—C₃H₇ | 11.18 |
| $C_{12}H_{25}$—pyrimidine—phenyl—O—CH₂CH₂—*CHF—C₃H₇ | 10.02 |
| $C_{12}H_{25}O$—phenyl—COO—(F)phenyl—$COOC_8H_{17}$ | 10.01 |

The phase transition of the liquid crystal is as shown in below.

Cry←(–4.5° C.)→SmC*←(50.2° C.)→SmA←(71.9° C.)→Iso

The liquid crystal exhibited a spontaneous polarization of 7.0 nC/cm² at 25° C. which was calculated through measurement of current caused by displacement inversion in response to application of triangular pulses of ±5 V/μm. The response speed to ±10 V/μm square wave input pulses is as high as 27 μsec at 25° C. Multi-micro-domains were observed by a polarizing microscope in this condition and no zig-zag defect was confirmed. The contrast ratio was 20 when the liquid crystal display was driven by 4-pulse multiplex operation at a bias ratio of ¼.

An XRD measurement was performed on a liquid crystal cell (a horizontally oriented cell) having been fabricated in accordance with the process and the material as above, using 0.1 mm thick glass substrates. Separately, a vertically oriented cell was fabricated using the same liquid crystal material and glass substrates each 0.1 mm in thickness. The materials capable of imparting a vertical orientation to the same liquid crystal material included lecithin, chromium complexes, or Surfine-150® (a product from Dainippon Ink Co., Ltd.). The spacing of the layered structure of the ferroelectric liquid crystal was obtained as 30.86 Å by performing the θ-scanning (θ-2θ scanning) method applying an X-ray diffractometer to the vertically oriented cell. The Bragg angle was determined as 2.86 degrees based on the result thus obtained, and the horizontally oriented cell was fixed at the Bragg angle to obtain the angle of layer inclination by the θ-scanning method. The XRD pattern thus obtained yielded two peaks, one at 78.5 degrees and distributed over an angle range of 76.0 to 81 degrees, and the other at 99.3 degrees, being distributed from 96.6 to 102.0 degrees.

Figure 4A:
FIG. 4(A) is a copy of a photograph taken by a polarizing microscope showing multi-micro-domains in accordance with the present invention.
Figure 4B:
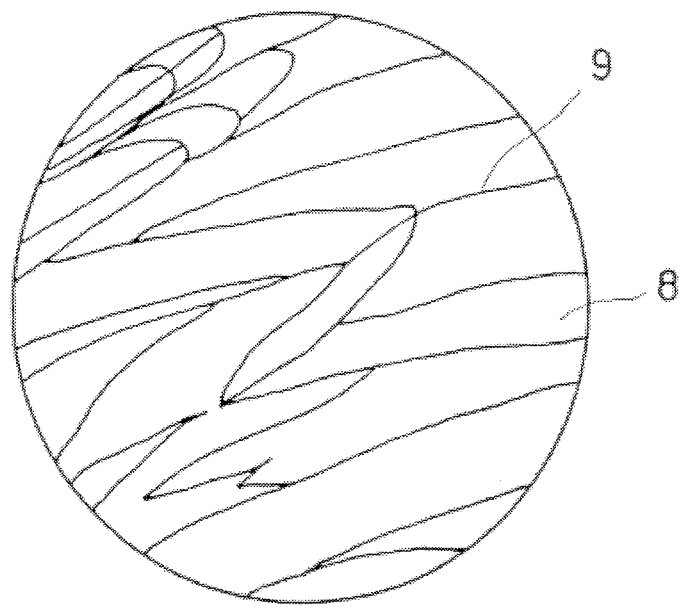
FIG. 4(B) is a schematic illustration of the photograph of FIG. 4(A).
Figure 11A:
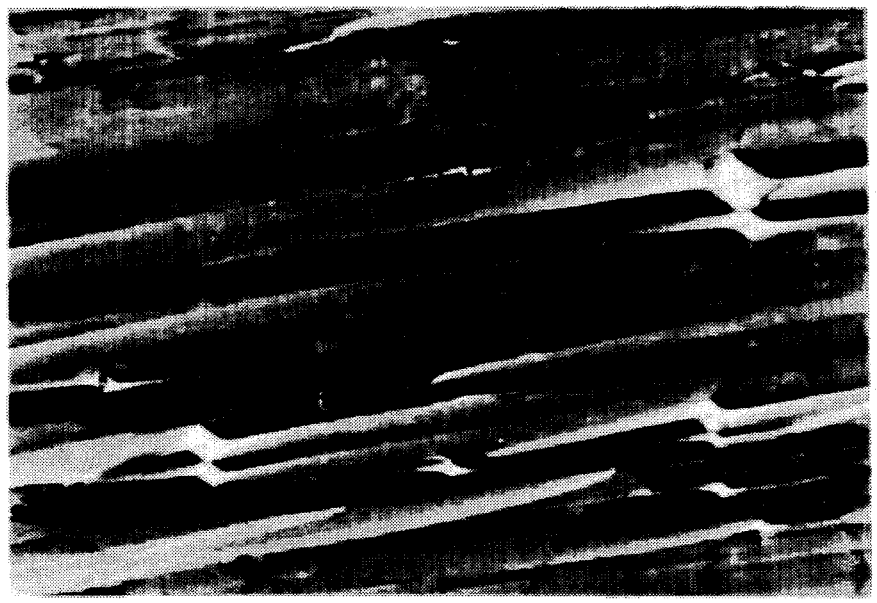
FIG. 11(a) is a copy of an optical micrograph showing a crystal structure of a liquid crystal having a molecular orientation according to the present invention.
Figure 11B:
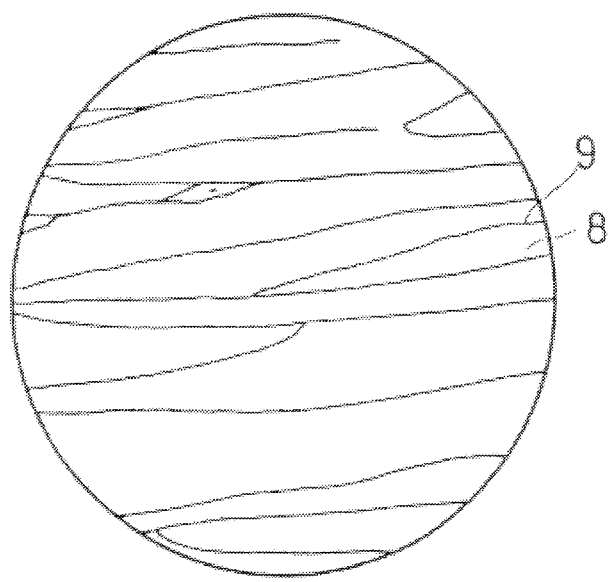
FIG. 11(b) is a schematically drawn crystal structure of the liquid crystal the optical micrograph of which is given in FIG. 11(a).
Figure 12:
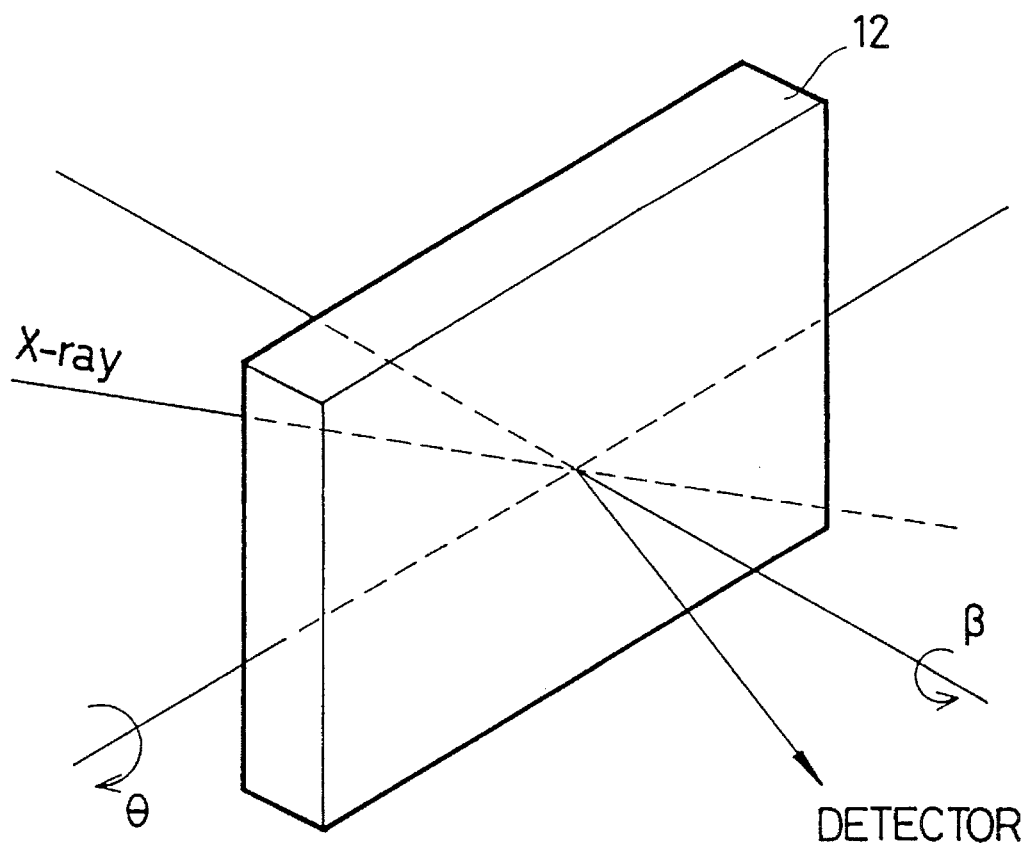
FIG. 12 is an explanatory drawing to show conceptually the methods of XRD.
Figure 13:
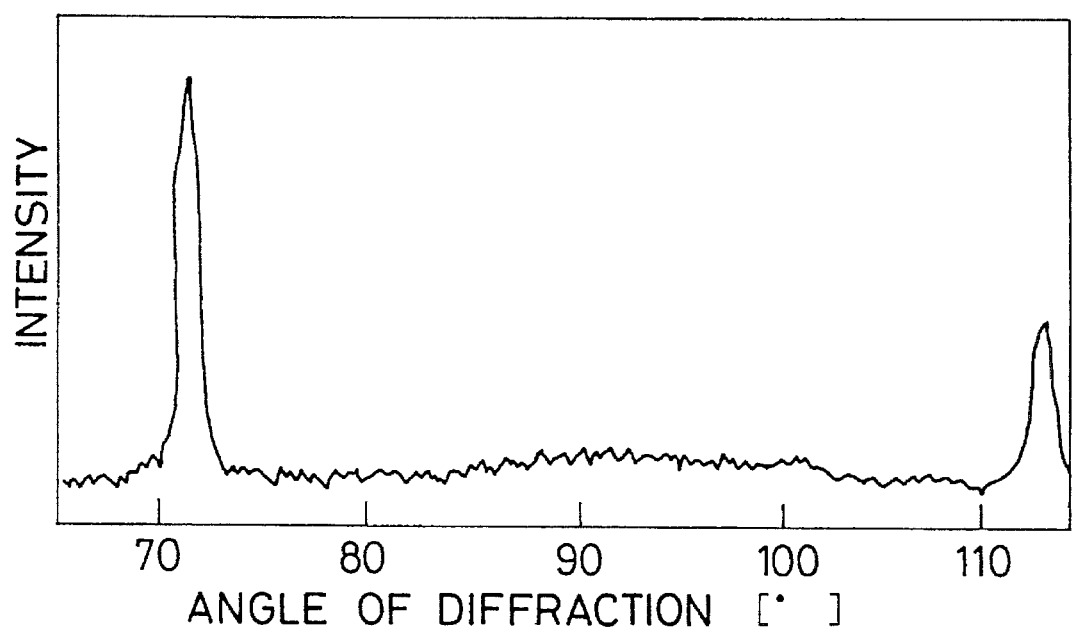
FIG. 13 shows an XRD pattern obtained by θ-scanning a conventional liquid crystal.
Figure 14:
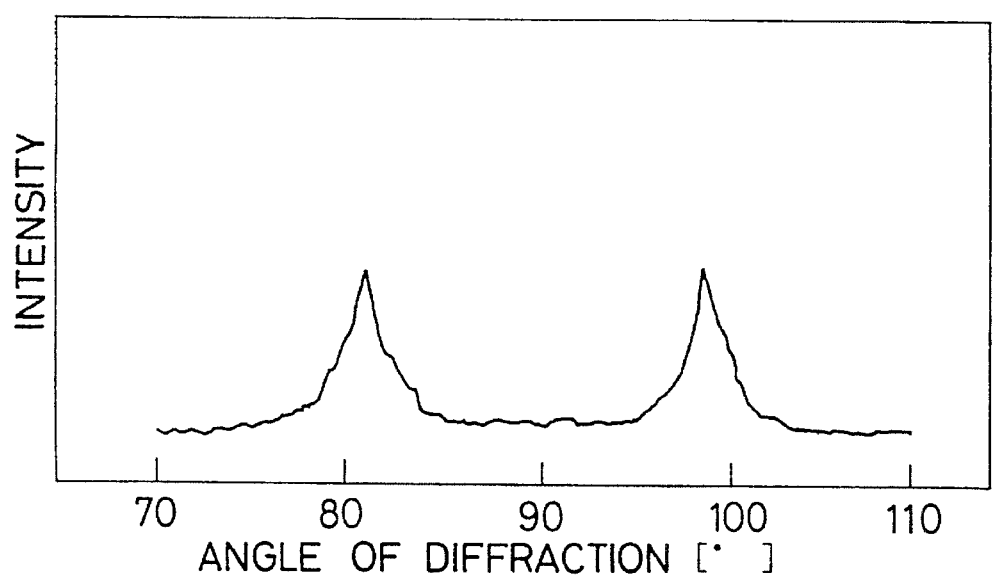
FIG. 14 shows an XRD pattern obtained by θ-scanning a liquid crystal according to the present invention.
Figure 15:
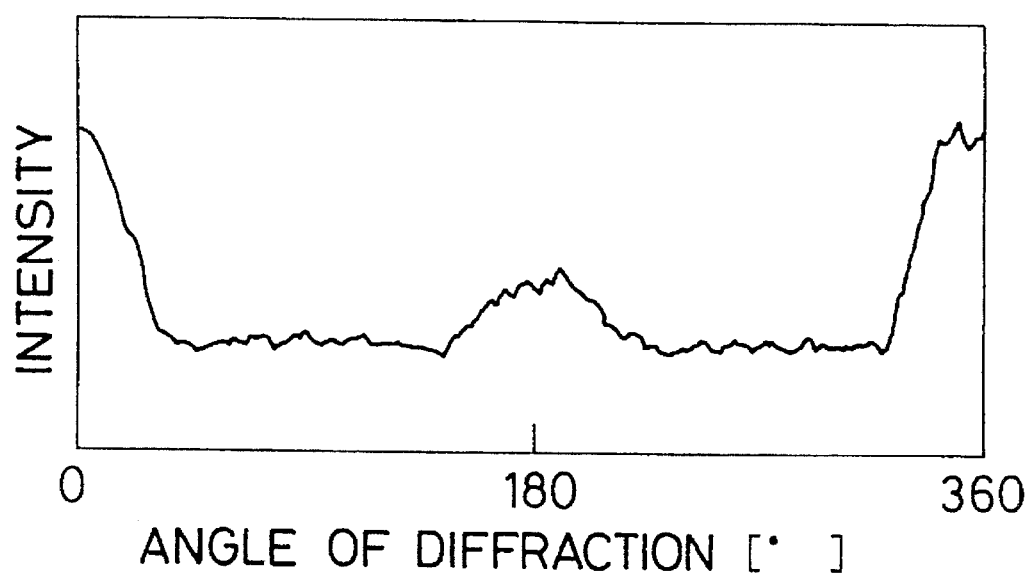
FIG. 15 shows an XRD pattern obtained by β-scanning a liquid crystal according to the present invention.

The liquid crystal cell thus obtained revealed a molecular orientation in a multi-microdomain state under an optical microscope as shown in FIGS. 4(A) and 11(a), free from typical zigzag defects. It can be seen from the schematic drawing given in FIGS. 4(B) and 11(b) that the individual multi-microdomain 8 is from several tens to several hundreds of micrometers (μm) in size, having an aspect ratio (the major axis/the minor axis ratio) of about 5 to 500. The defects in the liquid crystal orientation in such a multi-micro-domain structure are relaxed by the domain boundary 9 so that no typical zigzag defects and the like are observed in the liquid crystal electro-optical device as a whole. Thus, a display having a uniform and high contrast ratio over the whole device was realized upon input of a drive signal from an external circuit.

The liquid crystal display as shown in FIG. 3 is filled with another liquid crystal material, prepared by mixing materials as follows, for demonstrating a second embodiment of the present invention:

| Chemical Formula | Mol % |
|---|---|
| 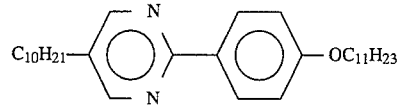 | 1.9 |
| 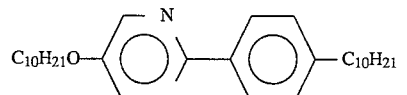 | 1.9 |
| 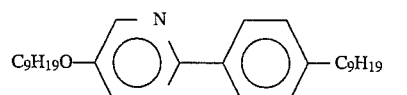 | 2.4 |
| 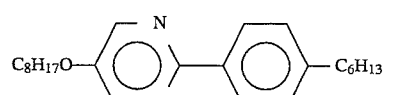 | 3.2 |

-continued

| Chemical Formula | Mol % |
|---|---|
| 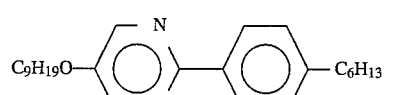 | 3.1 |
| 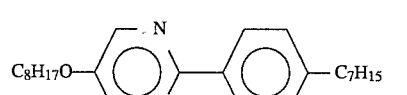 | 6.3 |
| 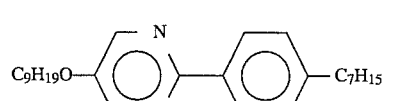 | 6.7 |
| 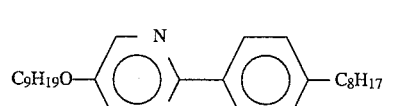 | 9.6 |
| 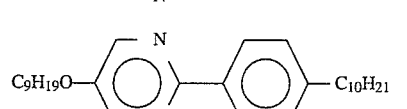 | 11.5 |
| 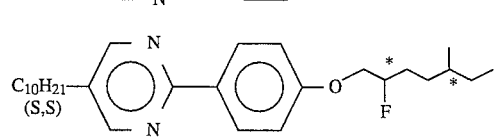 | 6.8 |
| 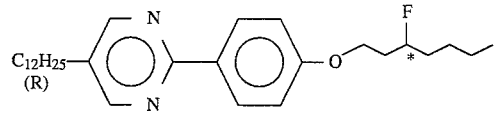 | 7.3 |
| 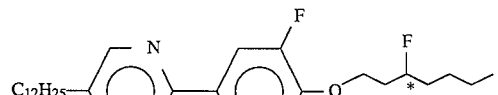 | 8.7 |
| 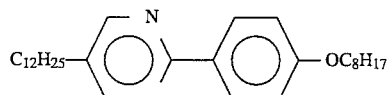 | 5.3 |
| 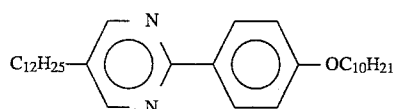 | 10.5 |
| 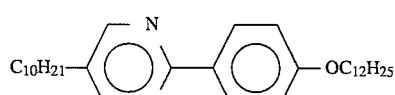 | 1.5 |
| 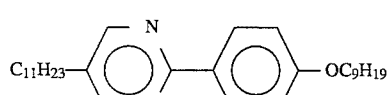 | 2.0 |

-continued

| Chemical Formula | Mol % |
|---|---|
|  $C_{12}H_{25}O\text{—}\bigcirc\text{—COO—}\bigcirc(F)\text{—COOC}_8H_{17}$ | 11.01 |

The phase transition of the liquid crystal is as shown below.

Cry←(−7.4° C.)→SmC*←(48° C.)→SmA←(74° C.)→Iso

The liquid crystal exhibited a spontaneous polarization of 12.3 nC/cm$^2$ at 25° C. which was calculated through measurement of current caused by displacement inversion in response to application of triangular pulses of ±5 V/μm. The response speed to ±10 V/μm square wave input pulses is as high as 21 μsec at 25° C. Multi-micro-domains were observed by a microscope in this condition and the absence of zig-zag defects was confirmed. The contrast ratio was 11 when the liquid crystal display was driven by 4-pulse multiplex operation at a bias ratio of ¼.

The spacing was measured as 30.13 Å on a vertically oriented cell. Then, by fixing the Bragg angle to 2.93 degrees, the horizontally oriented cell was subjected to θ-scanning (θ-2θ scanning) to obtain two diffraction peaks at an angle of 80.8 degrees (±3.7 degrees) and at 98.6 degrees (±3.3 degrees).

Then, while setting θ to 80.8 degrees as obtained by θ-scanning, the cell was rotated around the substrate normal to conduct the β-scanning. The XRD pattern obtained as a result yielded two peaks at 0 degrees (±34.8 degrees) and 180 degrees (±37.2 degrees), indicating that the layer normal was distributed with respect to the orientation control direction (the direction of the uniaxial orientation treatment) at a maximum angle of about 36 degrees.

As a comparative example, a liquid crystal is prepared by mixing materials as follows, and disposed in the liquid crystal display shown in FIG. 3:

| Chemical Formula | Mol % |
|---|---|
|  $C_8H_{17}\text{—pyrimidine—}\bigcirc\text{—OC}_8H_{17}$ | 17.84 |
|  $C_8H_{17}\text{—pyrimidine—}\bigcirc\text{—OC}_6H_{13}$ | 19.21 |
| 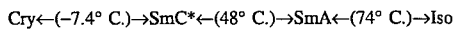 $C_6H_{13}\text{—pyrimidine—}\bigcirc\text{—OC}_8H_{17}$ | 19.21 |
| 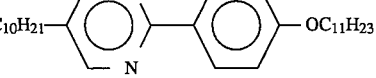 $C_8H_{17}\text{—pyrimidine—}\bigcirc\text{—OC}_{10}H_{21}$ | 16.68 |
| 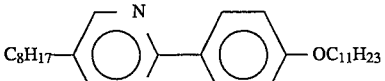 $C_7H_{15}\text{—pyrimidine—}\bigcirc\text{—OC}_9H_{19}$ | 17.83 |
| 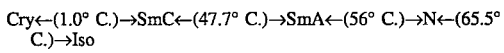 $C_{12}H_{25}(R)\text{—pyrimidine—}\bigcirc\text{—O—CH}_2\text{CH}_2\text{—C*HF—}C_3H_7$ | 9.23 |

The phase transition of the liquid crystal is as shown below.

Cry←(1.0° C.)→SmC←(47.7° C.)→SmA←(56° C.)→N←(65.5° C.)→Iso

The liquid crystal exhibited a spontaneous polarization of 2.6 nC/cm$^2$ at 25° C. The response speed to ±10 V/μm square wave input pulses is as low as 126 μsec at 25° C. The contrast ratio obtained was 3 or less.

As another comparative example, a liquid crystal is prepared by mixing materials as follows, and disposed in the liquid crystal display shown in FIG. 3:

| Chemical Formula | Mol % |
|---|---|
|  $C_{10}H_{21}\text{—pyrimidine—}\bigcirc\text{—OC}_{11}H_{23}$ | 9.9 |
| 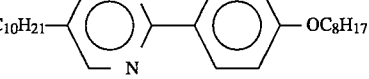 $C_8H_{17}\text{—pyrimidine—}\bigcirc\text{—OC}_{11}H_{23}$ | 10.2 |
| 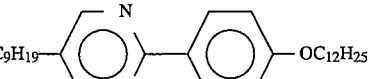 $C_{10}H_{21}\text{—pyrimidine—}\bigcirc\text{—OC}_8H_{17}$ | 11.5 |
|  $C_9H_{19}\text{—pyrimidine—}\bigcirc\text{—OC}_{12}H_{25}$ | 10.7 |
| $C_8H_{17}\text{—pyrimidine—}\bigcirc\text{—OC}_8H_{17}$ | 11.3 |
| $C_9H_{19}\text{—pyrimidine—}\bigcirc\text{—OC}_8H_{17}$ | 11.9 |
|  $C_{12}H_{25}\text{—pyrimidine—}\bigcirc\text{—O—CH}_2\text{CH}_2\text{—C*HF—}C_3H_7$ | 23.6 |

The phase transition of the liquid crystal is as shown below.

Cry←(1.7° C.)→SmC*←(63.1° C.)→SmA←(70.6° C.)→Iso

Figure 5:
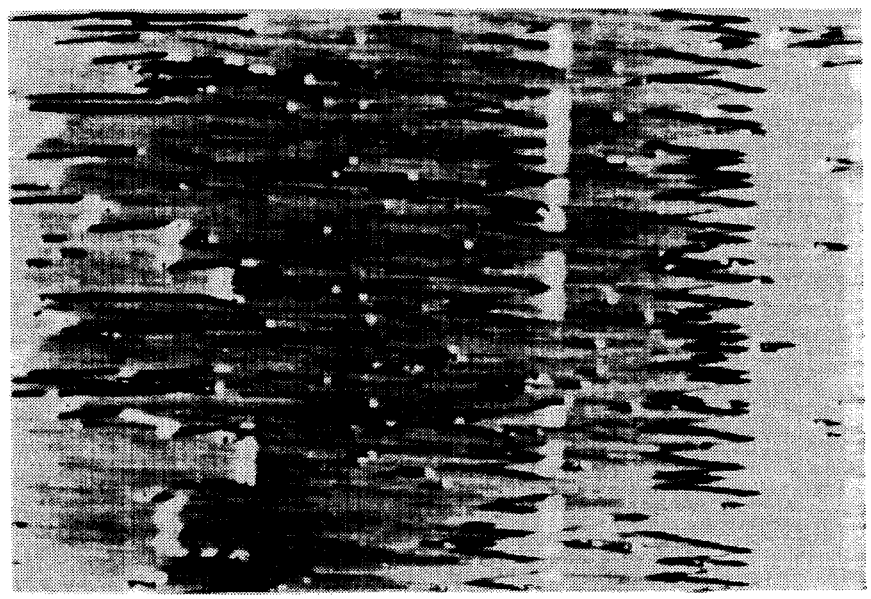
FIG. 5 is a copy of a photograph taken by a polarizing microscope showing zig-zag defects in accordance with prior art.

In this case, a number of typical zig-zag defects were observed by a microscope as shown in FIG. 5. The response speed to ±10 V/μm square wave input pulses is 43 μsec at 25° C. The contrast ratio obtained was as low as 1.5 because of the zig-zag defects.

Next, a third embodiment in accordance with the present invention will be explained. The liquid crystal disposed in the display shown in FIG. 3 is prepared by mixing materials as follows:

| Chemical Formula | Mol % |
|---|---|
|  | 9.1 |
|  | 9.6 |
| 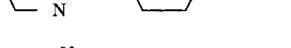 | 10.0 |
| 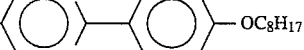 | 9.7 |
| 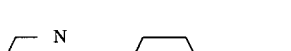 | 10.0 |
|  | 9.9 |
|  | 10.9 |
| 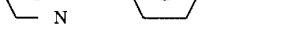 | 21.1 |
|  | 9.7 |

The phase transition of the liquid crystal is as shown in below.

Cry←(−7.1° C)→SmC*←(41.2° C.)→SmA←(71.7° C.)→Iso

Figure 6:
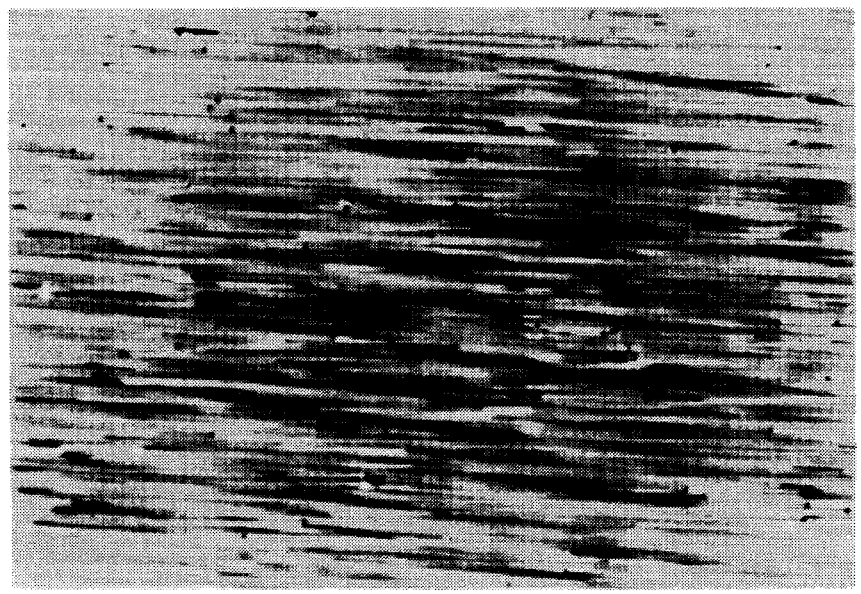
FIG. 6 is a copy of a photograph taken by a polarizing microscope showing multi-micro-domains in accordance with the present invention.

Multi-micro-domains were observed by a polarizing microscope as shown in FIG. 6 and no zig-zag defect was confirmed throughout the display. The response speed to ±10 V/μm square wave input pulses is as high as 26.4 μsec at 25° C. The contrast ratio was 10 when the liquid crystal display was driven by 4-pulse multiplex operation at a bias ratio of ¼.

The dependence of the contrast ratio on the combination of the orientation control films in the display shown in FIG. 3 was examined. When both the substrates 2 and 2' were coated with polyimide films which were subsequently given rubbing treatment, a number of zig-zag defects were observed and the contrast ratio was measured to be 2. When the substrate 2 was coated with a polyimide film and given rubbing treatment thereafter and the substrate 2' was coated with a $SiO_2$ film, multi-micro-domains were observed and the contrast ratio was measured to be 13. When the substrate 2 was coated with a polyimide film and given rubbing treatment thereafter and the substrate 2' carrying the electrode set 3' was not coated with any film, multi-microdomains were observed and the contrast ratio was measured to be 20. In the experiments, polyimide LP-84 manufactured by Toray Industries Inc. and $SiO_2$ ZQ-2 manufactured by Catalyst Chemicals Corp. were used. These films were formed to a thickness of 100 to 500 Å and thermally annealed at 280° C. Thus, it is preferred that only one of the inside surfaces of the substrates is provided with an orientation control surface, e.g. the rubbed surface of polyimide film, thereon.

Figure 7:
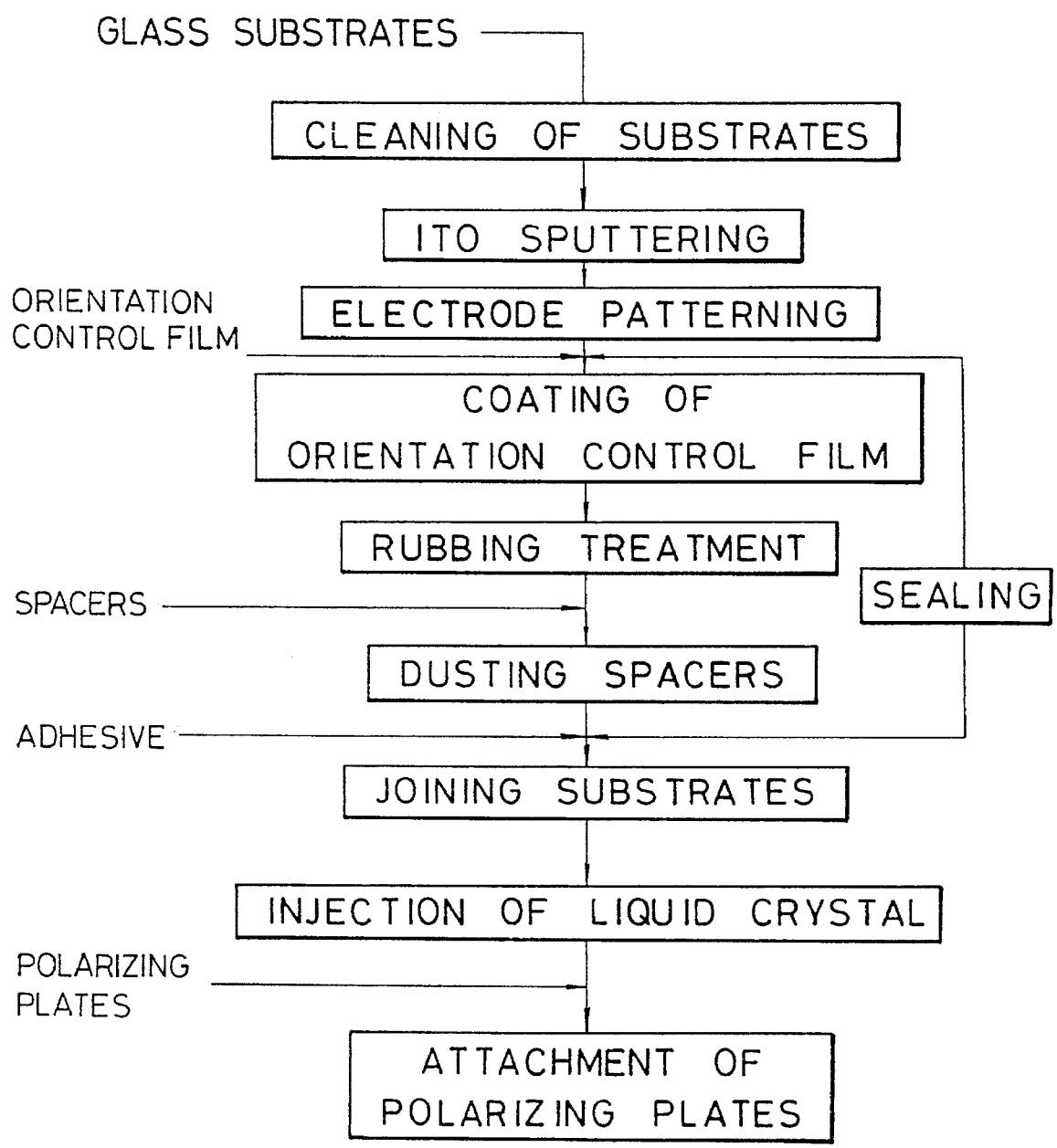
FIG. 7 is a flow chart showing a method of manufacturing liquid crystal display in accordance with the present invention.

Next, a method of manufacturing a liquid crystal display of 640 (horizontal)×400 (vertical) pixel in accordance with the present invention will be explained with reference to FIGS. 3 and 8 and the flow chart shown in FIG. 7.

After cleaning sodalime glass substrates, the inside surfaces of the substrates 2 and 2' are formed with an electrode arrangement comprising a pair of parallel electrode sets 3 and 3' in an orthogonal relationship in order to form pixels arranged in a matrix. The width of the electrodes is 250 μm. The spacing between adjacent electrodes is 250 μm. The electrode arrangement is formed by depositing an ITO film of 1200 Å thickness by sputtering and etching it with a photoresist mask by the use of an acid etchant including ferric oxide (FeO). The sheet resistance of the electrodes is 15–25 Ω/cm². One of the substrates is coated with an orientation control film 4 covering the electrode set 3.

The orientation control film 4 is made of an organic resin, e.g. a nylon or a polyimide (LQ5200 manufactured by Hitachi Chemical Co., Ltd., LP-64 manufactured by Toray Industries, Inc., or JIB manufactured by Japan Synthetic Rubber Ltd.). One of these organic materials is coated on the substrate 2 over the electrode set 3 by spin coating, offset press printing or any other suitable method depending upon the material, followed by thermal annealing. The temperature of the annealing is 100°–130° C. in the case of nylons, 250°–300° C., preferably 280°–300° C. in the case of polyimides. The thickness of the film 4 is 100–500 Å. Rubbing treatment is given thereto as a one-axis orientation treatment by the use of a cotton velvet having piles of 2.5 to 3 mm height and turning at 1000 to 1500 rpm with respect to the substrate moving at 100 to 400 cm/min.

After dusting spacers of 2.5 μm silicon oxide particles on the orientation control film 4 and forming the sealing 6 on the substrates, the substrate 2 is joined with the other substrate 2' given no orientation treatment followed by injection therebetween of a ferroelectric liquid crystal which is heated to be an isotropic liquid crystal by utilizing the differential pressure between the external space and the inside of the device (vacuum method). Finally, a pair of polarizing plates 1 and 1' are attached to the substrates 2 and 2'. In accordance with this embodiment, a connector or flexible printed circuit 19 is connected with a printed circuit board 17 which, in turn, is connected with a printed circuit board 31 through a connector or flexible printed circuit 18 as illustrated in FIG. 8. The printed circuit boards 17 and 31 are connected with the periphery of the liquid crystal panel 13 through tape-automated-bondings (TABs) 16 as illustrated in FIG. 8. Signals are supplied to the connector or flexible printed circuit 19 from a controller 103 shown in FIG. 10. In FIG. 8, reference numerals 14 and 15 designate polarizing plates.

Figure 9:
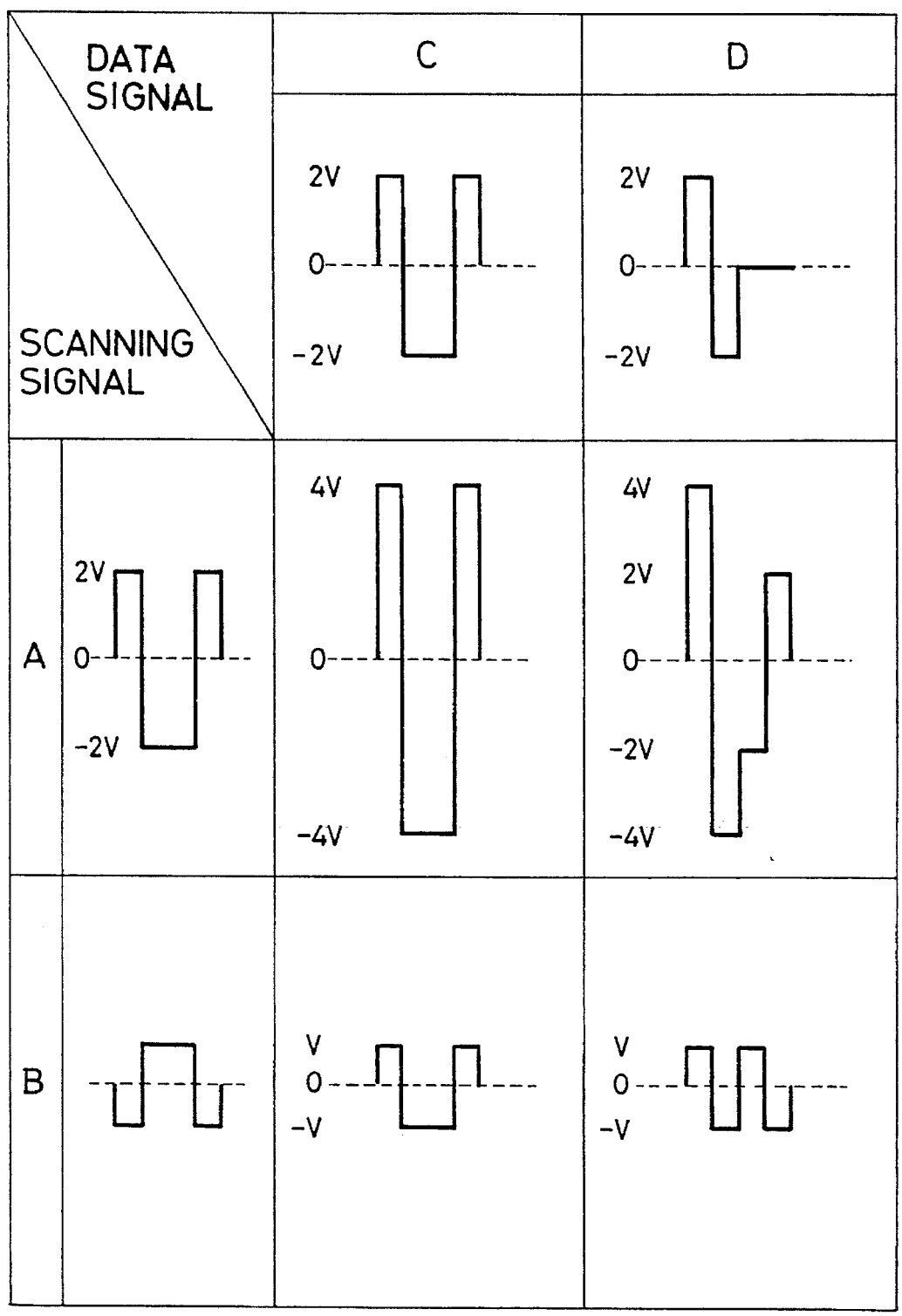
FIG. 9 is a graphical diagram for explaining a method of driving a ferroelectric liquid crystal device in accordance with the present invention.
Figure 10:
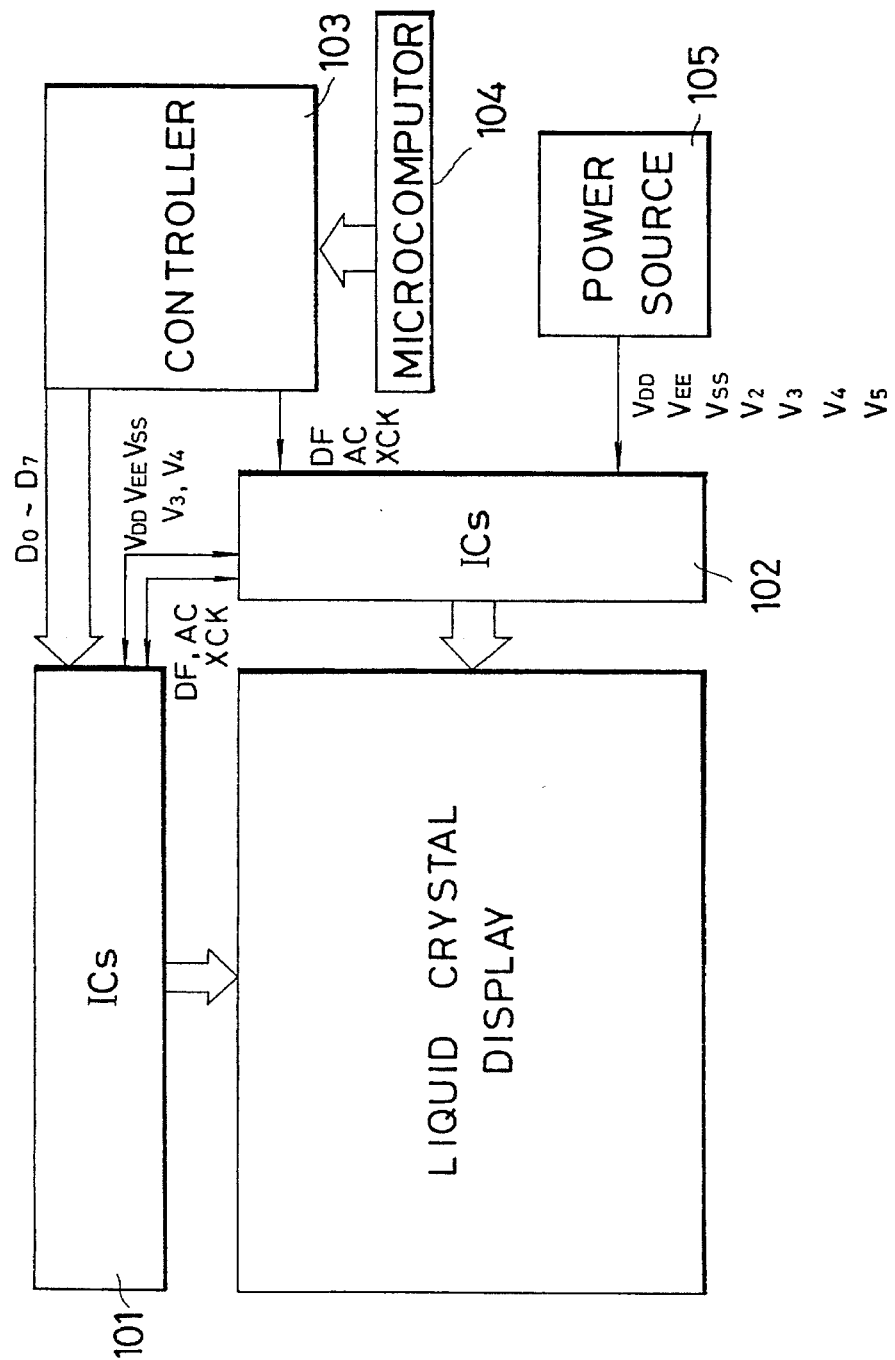
FIG. 10 is a schematic diagram showing peripheral circuits for driving a ferroelectric liquid crystal device in accordance with the present invention.

An exemplary method of driving the liquid crystal display will be explained with reference to FIG. 9. FIG. 9 shows the voltage applied across the liquid crystal in response to signals A, B, C and D selectively applied to the electrode sets 3 and 3'. In the figure, the signal A (selection signal) is to be applied to an electrode strip of the set 3 corresponding to a selected column during scanning; the signal B (non-selection signal) is to be applied to electrode strips of the set 3 corresponding to non-selected columns during scanning; the signal C is to be applied to an electrode(s) of the set 3' corresponding to a selected pixel(s) (white pixel) of the selected column; and the signal D is to be applied to an electrode(s) of the set 3' corresponding to a non-selected pixel(s) (black pixel) of the selected column. FIG. 10 is a block diagram showing a peripheral circuitry for driving the liquid crystal display. The peripheral circuitry comprises ICs for driving liquid crystal display 101, ICs for driving liquid crystal display 102, a controller 103, a microcomputer 104 and a power source 105 as illustrated in FIG. 10. Image data are supplied from the microcomputer 104 and received by the controller 103. The controller 103 supplies signals to the liquid crystal display through the ICs 101 and 102. The liquid crystal display is then driven.

Figure 8:
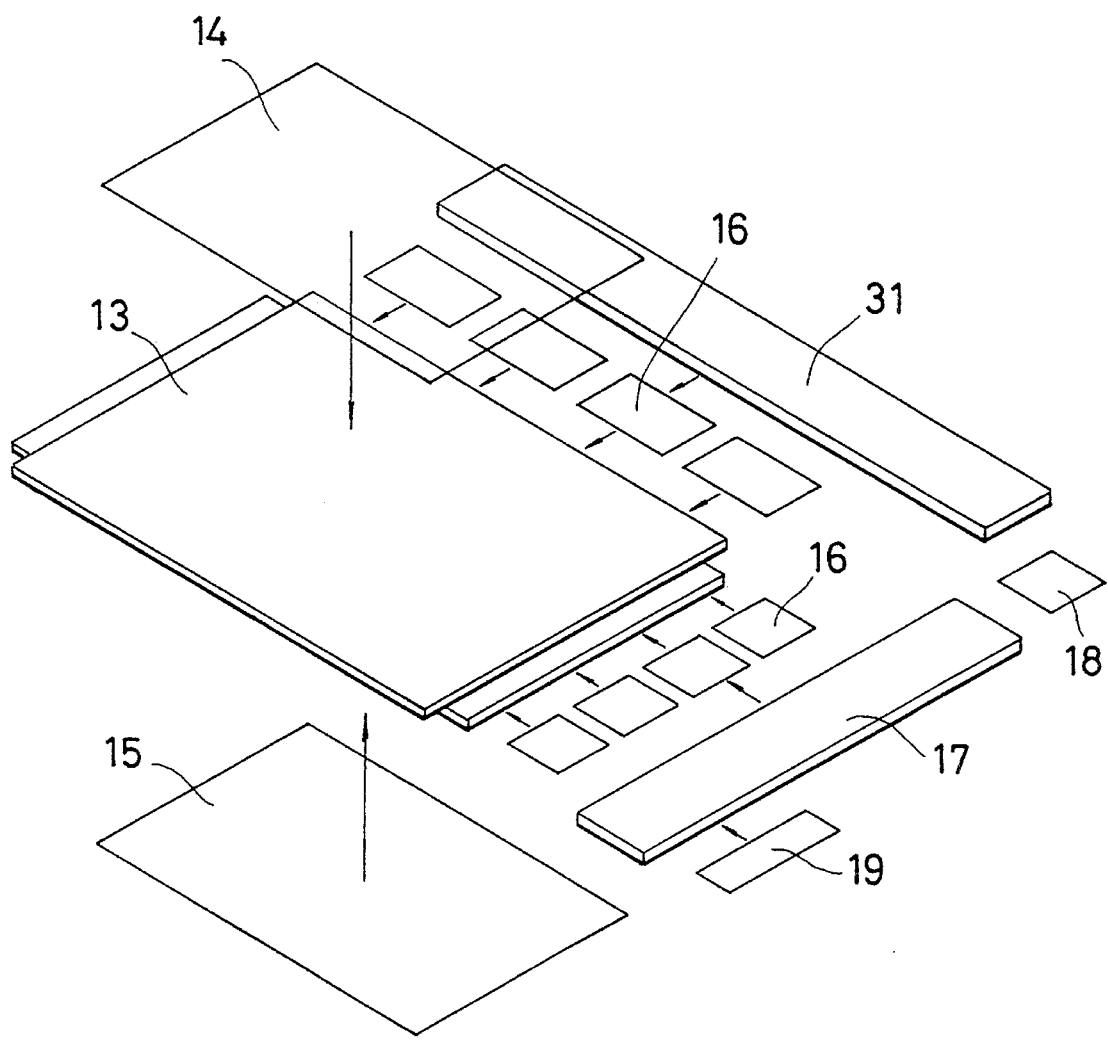
FIG. 8 is a perspective diagram showing a ferroelectric liquid crystal device in accordance with the present invention.

The liquid crystal electro-optical device cell on which a finer multi-microdomain orientation as shown in FIG. 8 can be observed was subjected to XRD measurements in the same manner as in the first and second embodiments.

First, the spacing of the layers was obtained on a vertically oriented cell as 37.1 Å. While fixing the Bragg angle to 2.38 degrees, the horizontally oriented cell was subjected to θ-scanning (θ-2θ scanning) to obtain two diffraction peaks at an angle of 82.3 degrees (±12.5 degrees) and at 90.95 degrees (±12.5 degrees).

Then, while fixing the θ to 82.8 degrees as obtained by θ-scanning, the cell was rotated around the substrate normal to conduct the β-scanning. The XRD pattern obtained as a result yielded two peaks at 0 degrees (±39.5 degrees) and 180 degrees (±43.0 degrees), indicating that the layer normal was distributed with respect to the orientation control direction (the direction of the uniaxial orientation treatment), the maximum deviation of which being at an angle of about 43 degrees.

As a further comparative example, a liquid crystal, ZLI-3654 (product from Merck Co., Ltd.), was injected into a cell similar to that used in the first embodiment. The liquid crystal cell thus obtained exhibited typical zigzag defects under an optical microscope with crossed nicols as shown in FIG. 5. Switching was hardly observed on the cell and there was an extremely low contrast ratio with AC drive signal of 2. On subjecting the liquid crystal cell having been fabricated from 0.1 mm thick glass substrates to XRD, diffraction peaks were obtained at 71.6 degrees (±0.9 degrees) and 112.0 degrees (±0.9 degrees). It can be seen that the layer was largely inclined, and, moreover, the peak was sharp with a narrow width.

The XRD pattern obtained by β-scanning the cell yielded two peaks at 0 degree (±24.4 degrees) and at 180 degrees (±12.8 degrees), indicating an extremely narrow distribution of the layer normal.

As a further comparative example, a liquid crystal cell was fabricated as above using ZLI-3488 (product from Merck Co., Ltd.) as the liquid crystal. The liquid crystal cell thus obtained exhibited typical zigzag defects under an optical microscope with crossed nicols. The contrast ratio was found to be 3. On subjecting the liquid crystal cell fabricated from 0.1 mm thick glass substrates to XRD, diffraction peaks were obtained at 70.84 degrees (±1.4 degrees) and 112.0 degrees (±1.4 degrees).

From the foregoing embodiments and comparative examples, it can be seen that liquid crystal electro-optical devices according to the present invention are free from optically detrimental defects such as zigzag defects and provide uniform display characteristics with a high contrast ratio when multiplex driven.

Figure 16:
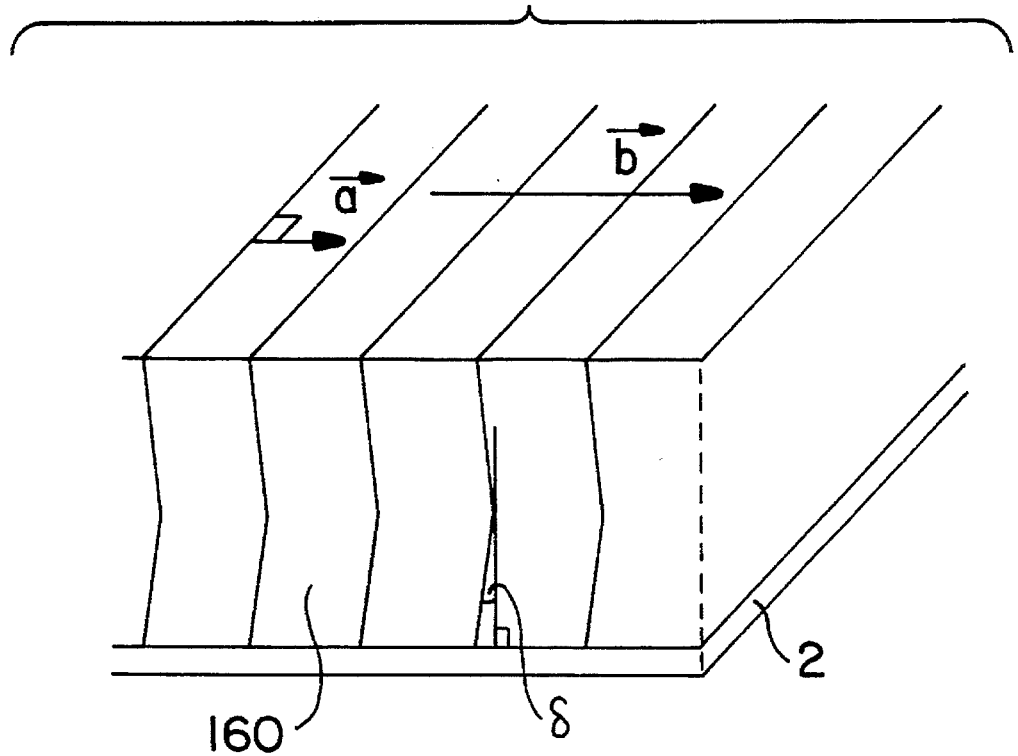
FIG. 16 shows the orientation of a smectic layer used in the present invention with respect to the orientation direction.
Figure 16:
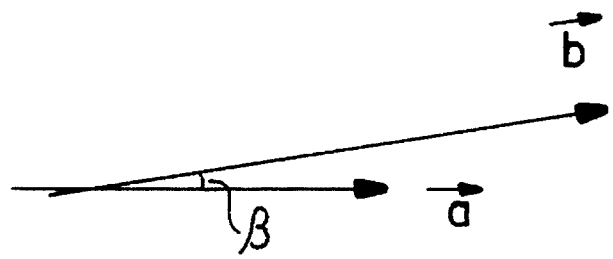

FIG. 16 shows a typical smectic layer 160 having a normal a and an orientation control direction b, as will be appreciated by those skilled in the art. The normal to the smectic layer (layer normal) and the orientation control direction are separated by an angle, shown in FIG. 16 as β. There is also an angle between the smectic layers 160 and a normal to the substrate 2, shown by δ.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An electro-optical device comprising:

a pair of substrates;

an orientation control surface provided on one of said substrates; and a ferroelectric liquid crystal material having smectic layers provided between said substrates, wherein angles of said smectic layers to a direction normal to said substrates are 5° to 15°, and projections of directions normal to said smectic layers onto a substrate plane are distributed with respect to an orientation control direction of said orientation control surface with a range of +25° or more.

2. The device of claim 1 wherein said angles of said smectic layers to the direction normal to said substrates are distributed in a range of 4° or more.

3. The device of claim 1 wherein said ferroelectric liquid crystal material comprises a liquid crystal composition of multi-micro domain orientation.

4. The device of claim 3 wherein a ratio (major axis)/(minor axis) of multi-micro domain of said liquid crystal composition is 5 to 500.

5. The device of claim 1 wherein said orientation control surface is a surface of a polyimide film provided on said one of said substrates which surface is rubbed in said orientation control direction.

6. The device of claim 1 wherein said orientation control surface is a surface of a nylon film provided on said one of said substrates which surface is rubbed in said orientation control direction.

7. The device of claim 1 wherein said angles of said smectic layers to the direction normal to said substrates and said angle between said projection of a normal and said orientation control direction are measured by X-ray diffraction.

8. An electro-optical device comprising:

a pair of substrates;

an orientation control surface provided on one of said substrates; and a ferroelectric liquid crystal material having smectic layers provided between said substrates, wherein projections of lines normal to said smectic layers onto a substrate plan distribute with respect to an orientation Control axis of said orientation control surface in a range of at least 25°.

9. The device of claim 8 wherein angles of said smectic layers to a direction normal to said substrates distribute at 4° or more.

10. The device of claim 9 wherein said orientation control surface is a surface of a polyimide film provided on said one of said substrates which surface is rubbed in said orientation control direction.

11. The device of claim 9 wherein said distributions of angles are measured by x-ray diffraction.

12. The device of claim 9 wherein said angles of said smectic layers to the direction normal to said substrates are measured by X-ray diffraction.

13. The device of claim 8 wherein said ferroelectric liquid crystal material comprises a liquid crystal composition of multi-micro domain orientation.

14. The device of claim 8 wherein said orientation control surface is a surface of a polyimide film provided on said one of said substrates which surface is rubbed in said orientation control direction.

15. The device of claim 8 wherein said orientation control surface is a surface of a nylon film provided on said one of said substrates which surface is rubbed in said orientation control direction.

16. The device of claim 8 wherein said angle between said projection of a normal and said orientation control direction is measured by X-ray diffraction.

\* \* \* \* \*